(12) United States Patent
Akae et al.

(10) Patent No.: US 6,638,488 B1
(45) Date of Patent: *Oct. 28, 2003

(54) METHOD AND APPARATUS FOR REMOVING ORGANIC HAZARDOUS SUBSTANCES USING SELECTED SOLVENTS

(76) Inventors: Yukoh Akae, 1-10-18, Maikosaka, Tarumi-ku, Kobe-shi, Hyogo-ken (JP); Kazuo Kote, 1969 Kawashima-cho, Asahi-ku, Yokohama-shi, Kanagawa-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/112,064

(22) Filed: Mar. 6, 2000

Related U.S. Application Data

(63) Continuation-in-part of application No. 09/138,951, filed on Aug. 24, 1998, now abandoned.
(51) Int. Cl.⁷ .............................. B01J 8/00; A62D 3/00
(52) U.S. Cl. .............................. 423/240 R; 423/240 S; 423/245.2; 208/262.1; 208/262.5; 588/206; 588/207; 588/242
(58) Field of Search ................................ 588/205, 206, 588/207, 224; 208/262.1, 262.5; 423/240 R, 245.2, 245.3, 240 S

(56) References Cited

U.S. PATENT DOCUMENTS

| | | | | |
|---|---|---|---|---|
| 4,081,512 A | * | 3/1978 | Yang et al. | 423/240 R |
| 4,793,931 A | * | 12/1988 | Stevens et al. | 134/1 |
| 5,151,395 A | * | 9/1992 | Tom | 502/407 |
| 5,986,161 A | * | 11/1999 | Akae et al. | 210/682 |
| 6,084,149 A | * | 7/2000 | Akae et al. | 204/158.2 |
| 6,344,175 B1 | * | 2/2002 | Akae et al. | 204/157.15 |

\* cited by examiner

*Primary Examiner*—Steven Bos
*Assistant Examiner*—Anthony Kuhar
(74) *Attorney, Agent, or Firm*—Irving Keschner

(57) ABSTRACT

Method and apparatus for isolating, decomposing, and fixing the organic hazardous substances in a stable manner using chemical techniques and isolating and decomposing the organic hazardous substances from various waste mixtures. The temperature treatment is preferably kept within room temperature range of between 0–30° C. The detoxification of the organic hazardous substances avoids secondary pollution of the environment when the treated materials are released in the soil, atmosphere, or in groundwater.

5 Claims, 1 Drawing Sheet

METHOD AND APPARATUS FOR REMOVING ORGANIC HAZARDOUS SUBSTANCES USING SELECTED SOLVENTS

RELATED APPLICATIONS

This application is a continuation-in-part of application Ser. No. 09/138,951, filed Aug. 24, 1998, now abandoned.

BACKGROUND OF INVENTION

1. Field of the Invention

The present invention provides method and apparatus for neutralizing and detoxifying organic hazardous substances comprising dibenzofuran, dibenzo-p-dioxin and its chlorides (dioxin), tetrachloroethylene, trichloroethylene (ethylene trichloride), cyan and other halogenated compounds.

2. Description of the Prior Art

As new technologies have been developed along with advancement of human beings, a vast amount of organic hazardous substances is continuously created in proportion to the degree of advancement Especially, the generation of dioxin and derivative compounds is mainly caused by incomplete combustion of a large amount of city refuse and industrial wastes in exhaust gas and ash in the incinerator. In addition, organic synthetic substances containing organic hazardous substances (for instance, pesticides, medicine, synthetic plastics, paints, and so on) are manufactured in large quantities. Further, the increase in the use of chloride family bactericides for kitchen refuse and chemicals for domestic animals is a cause of increasing hazardous substances introduced into the environment. The source of hazardous substances are solvents comprising dibenzofuran, 7,7,8,8-tetracyanodimethane, dioxane,: dichloroethyl ester (these compounds are non-protonic substances) and the group of molecules including formarine (37% formaldehyde solution used as a disinfectant), chloroform (trichloromethane, a disinfectant). Examples of organic hazardous substances are as follows:

(1) Tetrachoroethylene ($Cl_2C\!\!=\!\!CCl_2$)
(2) Trichloroethylene ($CHCl\!\!=\!\!CCL_2$)
(3) 2,4,6-trichlorophenol ($C_6H_3Cl_3O$)
(4) chlotbdibenzodioxine (=2,3,7,8-TCDD) and other 75 isomers
(5) chlorophenol ($C_6H_5ClO$)
(6) 1-chloro-2-propanol ($CH_2ClCH(OH)CH_3$)
(7) alkylhalide (($C_nH_{2n+3}$)X; where X is halogen
(8) allylhalide (($CH_2\!\!=\!\!CHCH$)X; where X is halogen
(9) organometallic compound; for instance, organic semimetal, arsenichloride (R—Hg; where R is alkyl group)

A high-temperature treatment through incineration is currently known in the prior art for detoxifying these hazardous substances including dioxin.

The conventional method for the removal of organic hazardous substances that is generally being practiced today is the incineration method. However, in most cases, hazardous molecules (halogen molecules) and other various organic hazardous compounds (chloro-benzene and the like) are mixed in exhaust gas, and an extremely complex and expensive apparatus is needed for the treatment at high temperature.

The prior art has noted that all compounds in the material can be decomposed into detoxified forms when incinerating at a high temperature. However, the inventors of the present invention are unaware that this contention of possible detoxification has been verified. In addition, there is no explanation for what kind of phenomenon carries out a complete incineration process at an extremely high temperature and it is not clear how and what kind of form the organic gas turns into. For instance, if a large amount of halogen, cyanide, and methane group is released in atmosphere, the atmospheric gas will become out of balance. Also, it is assumed that when an excessive amount of chlorine combines with other molecules like ozone and hydrogen in the atmosphere, hypochlorous acid is formed, resulting in acid rain and photochemical smog. In the same manner, it is presumed that dioxin would be completely decomposed if it is incinerated at a high temperature, but chlorine atoms and molecules will never be converted into any other element.

In addition, hazardous gas (halogenated compounds, hydrocarbons, cyanide, etc.) that is released into air from the smokestack of an incineration plant can form oxalaldehyde or biformyl (OHCCHO), for instance, through recombination under the influence of ozone (O3), vapor, ultraviolet, or electromagnetic wave in the atmosphere. On the other hand, through sublimation dioxin disperses into atmosphere and binds with benzene group existing in soil, then returns to the original form of dioxin. In other words, the chance of dioxin returning in the soil is high.

Hazardous substances including organic antimony (R—Sb), organic arsine (R—As), organic phosphor (R—P), organic mercury (R—Hg), organic bismuth (R—Bi) are the substances having strong magnetism and exist in a stable form in the incinerated ash. However, once they are exposed to ultraviolet, they are ionized depending on the conditions of decomposition and dissociation. Consequently, hazardous metal and alkyl gas will be generated.

The alkylated compounds as stated above will become hazardous substances through hydroxylation and halogenation reactions. As a result, these compounds can be dissolved, eluted, and widely dispersed to cause environmental pollution.

This object of the invention is to provide a simple and economical method and apparatus for removing organic hazardous substances from a variety of waste materials.

SUMMARY OF THE INVENTION

The present invention provides a method for removal, stable fixation, and detoxification of organic hazardous substances from the mixture of various waste materials in order to prevent environmental pollution.

The method for removing organic hazardous substances provided by the present invention starts from Lewis acid and base and in essence it is a chemical treatment method based on organic electron theory. Organic solvents used for (high voltage) transformers and power transmission are utilized to illustrate a representative case of organic hazardous substances treated by the method of the present invention.

The substances mixed in polar solvents (non-proton family) of the transformers comprise dioxane, dioxin (2,3,7,8-TCDD), and so on as the electron transfer complex compounds. Using the selected polar solvents in the invention, isolation and decomposition of these hazardous substances (dioxane, dioxin, and so on) is accomplished.

The processes of isolation and decomposition comprise replacement, hydrolysis, open-ring polymerization, and other reactions as well as the repetition of these reactions (continuous and simultaneous reactions).

The invention is based on the selection of the most satisfactory solvents and conditions for reaction (electrophilic replacement reaction, SE reaction) In other words, as to the physical properties of dioxin, from the standpoint of Muliken's theory of intermolecular electron transfer, dioxin is a charge transfer complex compound as an organic hazardous compound, and a resolution step starts from the selection of a matching solvent.

From the standpoint of quantum theory, most, appropriate techniques are examined by considering physical properties and characteristics of organic hazardous substances. Moreover, the major requirements for selecting agents for the treatment are the techniques as the conditions for the reaction of substances and treatment of exhaust gas (including apparatus) as well as those for stable fixation during decomposition and after treatment are considered.

On the other hand, when selecting a solvent that is most appropriate for an organic reaction, for instance, in order to avoid a hazard like intoxication due to the inhalation of gas, temperature was considered as a requirement to prevent dispersion of hazardous substances due to vaporization.

In addition, most of the isolated molecules from organic hazardous compounds have a melting point (m.p.) and a boiling point (b.p.) in the low temperature range and basic temperature for treatment is set within such temperature range. In other words, treatment temperature (ambience) is set as the standard temperature (27–30° C.). However, the chlorine group (m.p. −101.04° C., b.p. 34.1° C.) and cyanide group are recovered completely in a reaction furnace, where dual safety measures, including solvent handling procedure and an exhaust gas absorption device, especially as their physical properties are provided.

The removal work, in accordance with the teachings of the invention, (treatment with solvents) of organic hazardous substances is carried out by setting an upper temperature limit of 30° C. Therefore, the reactions of all reactants (including catalysts) are carried out in a solution so that the elevation of temperature is suppressed.

The present invention selects solvents depending on the physical properties, characteristics, and molecular structure of organic hazardous substances and to neutralize and detoxify them based on the treatment at room temperature or below.

Regardless of what the organic substances are, the solvents to neutralize and detoxify organic hazardous substances are selected so as to utilize chemical reaction with such selected solvents. The following catalysts and reactants are selected:

1. Nitrous ester: molecular formula R—ONO (R: alkyl group) or sodium nitrite: molecular formula NaNO2 (Solution 1)
2. Sodium 1-naphthylamine-4-sulfonate: molecular formula; C10H8(NH2)SO3Na (Solution 2)
3. 2-naphtol-4-sulfonic acid: molecular formula; C10H8O4S (Solution 3)
4. The isomer of compound in 3 (Solution 4)
5. Graphite (black lead) (Adsorbent 5)
6. Calcium oxide or (powdered) calcium hydroxide: molecular formula; CaO and Ca(OH)2 (Adsorbent 6)
7. Terpene as an unsaturated hydrocarbon group (compounds having an isopropyl group; (CH3) 2CH—). The reagents used in the embodiment is alpha terpineol, CAS [2438-12-1], molecular formula C10H18O. (Solvent 7)

The present invention thus provides a unique, effective, and economical method for the removal of organic hazardous substances (dioxin) that are contained in the solvents used for transformers from the polluted soil or landfill soil due to illegal dumping.

DESCRIPTION OF DRAWING

For a better understanding of the invention as well as other objects and further features thereof, reference is made to the following description which is to be read in conjunction with the sole FIGURE which illustrates the apparatus of the present invention.

DESCRIPTION OF THE PRESENT INVENTION

Figure 1:
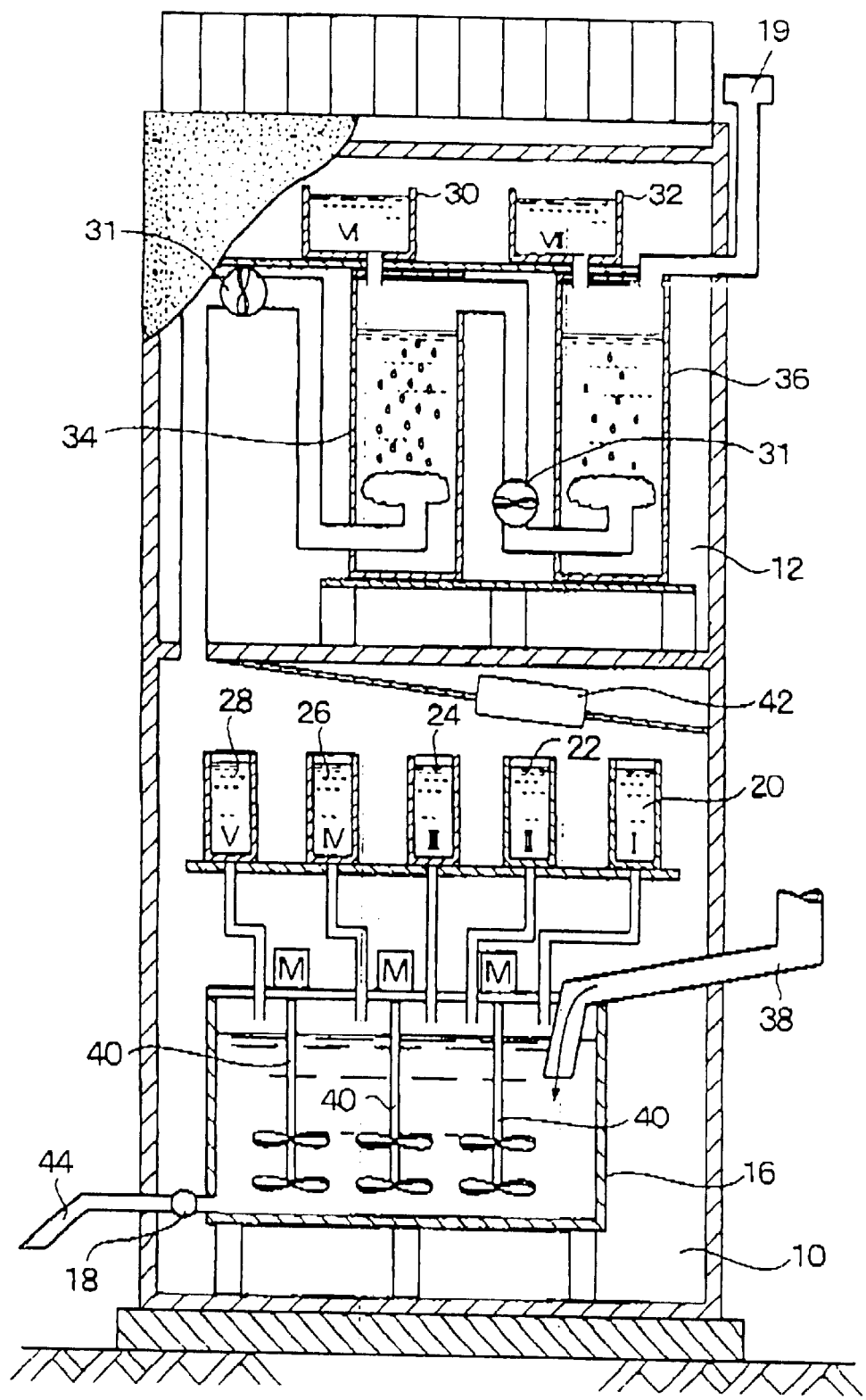

The method of the present invention is described hereinafter along with the reasons for using a particular solvent.

First Step (the use of Sodium Nitrite Solvent (Solution 1)

The purpose of the use of this solvent is, by stirring the mixture of the solvent in a transformer and sodium nitrite formed in the solution 1 made with solvent 1 in the presence of sodium nitrite, to absorb chlorine ion existing in the solvent of the transformer and methyl sulfide as a reduced form of methyl sulfoxide by sodium nitrite, further to oxidize methyl sulfoxide into methyl sulfone (colorless solid) with air in the presence of nitrogen monoxide within nitrous ion, and to move methyl sulfone from the solvent of the transformer to the solution (solution, liquid)

Second Step: Sodium 1-Naphthylamine-4-sulfonate as Solvent (Solution 2)

The purpose of the use of solution 2 is explained as follows: there are two types of electronic actions in the mixture (diazonium solution) made by mixing solution 1 and solution 2. One molecular group, the electron-attractive group, comprised of —NO2, —CN, —CHO, —SO3H, etc. has the acceptor action and another molecular group, the electron-donor group, has the donor group comprising of —OH, —CH3, naphthene group, —C6 H5, —NH2, and the like.

In addition to the above, bipolar molecules like nitrous ion (—NO2) are formed in the solution 1. Therefore, these molecular groups have nucleophilic substitution, electrophilic substitution, electrophilic addition, and redox action on the solvent of the transformer.

When the molecular groups having two types of polarity make contact to the electron transfer molecular group (dibenzo-p-dioxan, 2,3,7-8-TCDD [dioxin], etc.) in the solvent (non-protonic polar solvent) of the transformer, reactions like aromatic group replacement and dissociation (decomposition) take place. The crystallization due to open-ring polymerization of the dioxin group implies the decomposition of dioxan and dioxin. The phenomenon from the decomposition of 2,3,7,8-TCDD (dioxin) to open-ring polymerization of p-dioxin group is Diels-Alder type reaction and diphenophile takes place during crystallization results from diazo group (N2+).

The shape of the crystal is rectangular plate crystal and two kinds of crystals, large and small, are formed.

On the other hand, as to the state of the group of two kinds of polar molecules group when making contact, experimental results reflects Woodward-Hoffman rules. In other words, these reaction processes take place simultaneously and will end by the crystallization of dioxan that is the constituent molecule group of dioxin.

Since there are 75 isomers of 2,3,7,8-TCDD, 2,3,7,8 coordination (of chlorine group) is selected as the most standard structure and electron density distribution at each coordinate is calculated based on the molecular orbit method. As a result, at least two kinds of chlorine ion of all chlorine attached to dioxin (2,3,7,8-TCDD) have the nature of +1 valence are produced.

Third Step: 2-Naphtol-4-sulfonic Acid and the Solution of its Isomer as Solvent (Solution 3)

The purpose of this solvent is to utilize the electron-donating group in the solution as the nucleophilic reagent.

In other words, solution 3 (solvent 3) is used to isolate (ionized) various organic compounds and hazardous substances, or organic hazardous substances that are generated at the second step (for instance, cyanide [acetonitrile, etc.], methyl ketone (CH3CO—) compound) as shown below. These free radicals are subject to hydrolysis and promote diene formation.

For example, as to the gas generated besides the diazotization at the second step, examples of the reactions in the solution mixed with solvent 3 are listed as follows:

I. In the solution, cyanide ion exists as cyanic acid. (HO—C≡N) and acetonitrile (CH3CN) is reduced to form ethyl amine (CH3CH2NH2) or hydrolyzed to form acetic acid and ammonium (NH3) vai acetamide (CH3CONH2). In other words, electron donating property of the solution 3 is to promote the above reactions.

II. The ring-opening reaction of the compound having the diene group such as dioxan group (C4H4O2) is promoted by mixing with the solvent 3. Dienophile in the reaction is diazo group (—N≡N) and induces Diels-Adler type reaction to form a ring compound (crystal). However, if the temperature during treatment (in the solution) is set around 10° C., the solution 3 is no longer needed as to the ring-opening reaction of diene compounds.

III. Explanations are given for hypochloric acid formed in the solution as chlorine having +1 valence is dissociated, in corresponding to the rate determining step of hypochloric ((ClO) ion generated in the solvent 1, the solution 2, and the reaction tank, it can be accelerated by mixing with the solution 3 and hypochloric ion can be adsorbed by chloride ion and sodium nitrite group (SO3Na) In addition, hypochloric (ClO) ion generated in the ratedetermining step (secondary reaction) is dissociated into sodium chloride (NaCl) and oxonic acid (HCLO3) after adsorbed by sodium nitrite and sulfurous acid (sulfonic group). Then, hydrogen chloride ion will exist in the solution upon substitution with sodium ion through sodium chloride (NaCl).

Fourth Step: d Terpineol (Solvent 7)

A minute amount (for instance about 0.01% to the solvent amount in the transformer) of the solvent 7 is added. By utilizing the nature of d- terpineol that is susceptible to oxidation, hydroxide ion (OH) is donated to the solution to be used from the first to third steps, and alkyl group (unsaturated hydrocarbon group) and chloride ion are dissociated for alkaline salt compounds that may potentially exist in the solution and form alcohol group especially for the methyl group (CH3—).

Fifth Step: Graphite (Solid Adsorbent or Solvent 5) and Calcium Oxide [CaO] (Solid) Powdered Calcium Hydroxide (Powdered Calcium Hydroxide) (Ca(OH)2) (Solvent or Adsorbent 6)

Solvent 6 (Adsorbent 6) is added to the original mixture and stirred. In other words, at the completion of the fourth step (several hours later), the solvent in the transformer and the water soluble solution used from the first to the fourth steps is separated into two layers. Each of these layers is extracted and calcium oxide and graphite are added to the reaction solution containing reactant and ion group in the separated upper layer and stirred.

In another method, at the completion of the fourth step, mixture is left for several hours (in the embodiment it was left about one and a half hours). At this point, the solution up to the fourth step and the solvent in the transformer are completely separated into two layers. (For reference, this is the method for treating incinerated ash containing dioxin). In the upper layer, the solvent itself (white fine crystal in the solution) is observed. In the lower layer, two kinds of plate crystals of the solvent in the transformer are observed. In addition, clarity of the solution increased as compared with what was before the treatment. (It is in a HO state). It is separated into upper and lower layers. Then, solvent 5 (adsorbent 5) or solvent 6 (adsorbent 6) is placed in the solution of diazonium salt (purple brown) of the upper layer appearing as a pale color. In the embodiment calcium hydroxide in powder (solid) form is added. The purpose is to adsorb chloride ion, sodium chloride, chloric acid ion, etc.

Sixth Step: The Mixed Solvent Tank is Located at the Second Floor (Level) Where Sodium 1-Naphthylamine-4-sulfonate (Solution 2) and Sodium Nitrite (Solution 1) are Mixed in an Equimolar Ratio The solution in the mixed solvent tank may be 2-naphtol-4-sulfonic acid. The location is the second floor (level) of the apparatus for the above mentioned (Solution 2) in the sixth step or the tank for Solvent 3 (Solution 3) while the reaction tanks up to the fifth step are placed at the first floor (level). The exhaust from the first floor (level) is induced to the step tank located at the second floor (level).

At this point, reactions of all the organic hazardous substances are in progress and as indicated by the invention through chemical reaction with the solvent at each step, neutralization and detoxification processes of organic hazardous substances are completed.

The sole FIGURE illustrates apparatus for removing toxic substances from organic hazardous substances in accordance with the teachings of the invention.

The processing chamber 10 (liquid and solid phase, for both phases) is made airtight and temperature is adjusted to 30° C. or lower. The solvents specified in the invention are added to the original mixture (the mixture containing organic hazardous substances to be neutralized and detoxified) in a liquid or solid phase in the processing chamber 10.

The hazardous substances in the exhaust gas (gas phase), that may possibly be generated in the processing chamber 10, are removed in the processing chamber 12, when the organic hazardous substances generated during the treatment of the original mixture in a liquid or solid phase. (For example, what is generated by stirring hazardous gas in the exhaust during the removal process, or methyl group of cyanide group during removal of halogen group in a liquid or solid phase).

The state in which the organic hazardous substances to be detoxified are mixed with other substances can be classified basically into the following four groups:

(1) In the liquid mixture of organic hazardous substances and other organic solvents. For example, solvents in a transformer (Sample 1).

(2) When the solidifying agent is in a solid form as added to sample 1. For example, higher and long-chain fatty acid esters (Sample 2).

(3) When sample 1 (liquid phase) is mixed with other substances. For example, soiled sand (Sample 3).

(4) Organic hazardous substances in samples exist as they are or they are mixed with soil and groundwater in a gaseous state (Sample 4).

In any of the above four classifications, the removal treatment is basically the same but some differences may arise with the apparatus for removal. For example, in case of sample 4, the treatment can be done only with the processing chamber 10. However, as the volume of waste to be treated grows larger, it is necessary to provide additional apparatus to prevent dissipation and it is the key element to identify polluted areas as accurately as possible. (However, organic substances already released in the atmosphere is a separate issue.)

As to the above-mentioned samples 2, 3, and 4, it is possible to remove organic hazardous substances in a liquid or solid phase only with the processing chamber 10. In other words, removal can be achieved by implementing the first to fifth steps in the airtight processing chamber 10. Further, the removal of evaporated organic hazardous substances can be done by carrying out the treatment method at the seventh step in the processing chamber 12 to neutralize and detoxify each sample.

As to sample 1, the seventh step is not required and the bath is not utilized.

The organic hazardous substances in the solvent of transformer as stated in Sample 1 is removed from the mixed state mentioned above, followed by stable fixation and detoxification of the solvent, that is shown in the detailed embodiment that follows (detoxification of solvents used for transformers).

Studies regarding transformers indicate the following:

One of the organic hazardous substances existing in the solvents used for transformers is, for example, 2,3,7,8-dibenzo-dioxin and its isomers as the promoting agent for charge transfer, wherein a little amount of dioxan is mixed to equilibrate charge transfer complex in such solvents. In addition to this, acetone, dimethyl sulfoxide $[(CH_3)_2S=O]$, and the like are added.

When classifying non-protonic solvents, there are two kinds.

(1) The solvents having extremely low capability of donating protons: Acetone, dioxan.

(2) Those having a large dipole moment and being non-protonic (dipolar non-protonic solvent): Dimethyl sulfoxide (DMSO), acetonitrile (AN), dimethyl formamide $[HCON(CH_3)_2]$.

The electric charge characteristics desirable for the solvents of transformers is mainly that they do not contain protons (positive charge). If there are groups of atoms or molecules that have positive charges (protonic charge) in a transformer solvent, the more they exist, the higher the temperature of the solvent is elevated. It is preferred to protect the container from elevated temperature and better avoid the increase in electric resistance which deteriorates inductance between primary and secondary coils.

The major cause for the generation of protonic atoms in the transformer solvent is metal ions ($Pb^{2+}$, $Pb^{3+}$, $Cu^{2+}$) eluted from the transformer container. To these metal ions eluted from the container, dimethyl sulfoxide acts as an oxidant and undergoes reduction to turn dimethyl sulfide $(CH_3)_2S(CH_2)$, which is water-insoluble liquid but easily soluble in solvents and remains in the solvents of the transformers used and being used.

The state of oxidized metal ions after oxidation (that is the cause of colorization of solvents in the used transformer) is as follows:

(1) Lead oxide (trivalent), lead (divalent), lead trioxide $(Pb_2O_3)=(Pb''Pb'''O_3)$; yellow red amorphous substance.

(2) Copper oxide (monovalent) (CuO), cuprous oxide; yellow or red, water-insoluble;

Copper oxide (CuO), cupric oxide; black powder. The above are the cause of colorization of the solvents in the transformer (in used transformers, solvents have dissociated chlorine ion and dimethyl sulfide as a reduced member of dimethyl sulfoxide).

Specifically, the pole of the solvent in the transformer before use is anionic, but it turns into weak cationic or neutral after use.

However, as to the transformer solvents, since more of non-protonic solvents are mixed with organic solvents, the characteristics of organic solvents may vary to some extent from that disclosed by the transformer manufacturers.

Knowing the state of the used transformers as mentioned above, allows a step-by-step procedure to isolate organic hazardous substances from the colorized solvents in the used transformers and decompose them.

The subject for removal: The organic hazardous substances contained together with the solvents in the used transformers. 2,3,7,8-TCDD, dioxan, non-protonic solvents and chlorine ion.

When removing the organic hazardous substances from the transformer solvents, the apparatus utilized for this process (see the sole FIGURE) includes the airtight chamber 10 and the gas processing chamber 12 at the second floor (level). The organic hazardous substances in the used transformers and non-protonic solvents contained intrinsically in polar solvents are to be neutralized and detoxified. The treatment is performed in the airtight chamber 10 at the first floor and the evaporation (exhaustion) process is to be carried out at the second floor (chamber 12). However, as set forth hereinabove, the bath at the seventh step is not used for the transformer in Sample 1.

1. First Process Step

The solution 1 prepared in the solution tank 22 is put into the large processing bath 16 where organic solvents for transformers are contained. Then, the mixture is stirred for 4 to minutes by the stirrer 40. At this point, if the sample volume to be treated per one batch is excessive, it is necessary to extend the stirring time. The role of Solution 1 is to raise reaction to chlorine ion and dimethyl sulfide $[(CH_3SCH_3)]$ existing in the solvents of the used transformers. Two reactions take place at this point are shown in the chemical formulas set forth in Exhibit A.

When the solution is mixed with the solvents in the used T transformer, dimethyl sulfide existing in the solvents is oxidized with air to become dimethyl sulfoxide ($C_2H_6SO$), followed by oxidation to turn into dimethyl sulfone ($C_2H_6S_2O$) and them moved into the solution 1. (Formulas 2 and 3).

Dimethyl sulfoxide ($C_2H_6SO$) originally mixed in the organic solvents in the transformer is reduced in the form of dimethyl sulfide [$CH_3O_2S$] while the transformer is being used. Then, by mixing with the solution 1 and stirring, it will become a colorless crystal, dimethyl sulfone, through, oxidation with air by stirring to recover in the solution 1.

2. Second Process Step

The reagent used in this step is the solution of sodium 1-naphthylamine-4-sulfonate (Solution 2; Solvent 2). Next, (Solution 2) in the processing bath 22 is put in the tank 16 and the mixture is stirred for 15 minutes. At this point, the mixing ratio is 10% volume to the transformer liquid.

This step can be referred to as the adsorption process chlorine group (halogen group) by diazonium salt indicated with Formula 4, which is formed by mixing (Solution 1) and (Solution 2) It is acceptable to put the mixture of (Solution 1) and (Solution 2) at the equal molar ratio into the transformer solvent bath 16 upon mixing in the processing bath 22. However, in this case, if the temperature of the mixture is maintained from 5 to 15° C., a larger effect can be expected.

The addition of (Solution 2) may trigger two major reactions as follows:

(I) The reaction between the chlorine group coordinated to the dioxin contained in the reaction bath 16, and aromatic diazonium salt.

(II) Solution 2 is used in course of the second step.
Moreover, Solution 2 is supplied afterwards, mixed from the solution tank 24.
The purpose of mixing is to raise the reaction between diazonium ion and primary amine, and through the coupling reaction to generate azo compound (Formula 5). The purpose of the azo compound is to adsorb methyl group to be formed upon substitution and decomposition at the second step (Formula 6).

The following describes a series of reactions and processes as stated in (I) and (II) above. As to (I), based on the organic electron theory starting with Lewis acid-base theory and explained along with the embodiment shown with Formula 1, the state of the formation of diazonium salt can be expressed with the reaction designated with Formula 4.

In other words, there are two kinds of electronic characteristics of the substitute groups existing in the equi-molar mixture of (Solution 1) and (Solution 2) One is the electron-attractive property, which is represented by diazo base ($-N_2^+$) and sodium sulfonate group ($-SO_3Na$)1 and another is electron-donor property, which is represented by amino group ($-NH_2$) and naphthyl group ($C_{10}H_9-$)

In addition, nitrous group ($-NO_2$) that is formed as Solution 1 adsorbs chlorine in the transformer solvent, indicates both properties. As describing the polarizing effect of these substitute group and nitrous ion contained in Solution 2, they are:

(I) E effect as the electromeric effect allows sodium sulfonate to be released (a free form) through electron transfer of naphthene group.

(II) I effect which is one of the electrometric effects allows to form diaxonium salt from hydrogen group ($-H_2$) of amine group ($-NH_2$) in the presence of nitrous group ($-NO_2$). (Formula 4)

The mixture of Solution 1 and Solution 2 and Solution 1, that has electron transfer molecules and substitute groups, are mixed in the organic solvents in the transformer, and various reactions such as substitution and oxidation then desalination take place while stirring. As to dioxin (2,3,7,8-TCDD and other isomers) in the solvents, it can be described as follows:

(A) According to Milliken's intermolecular charge transfer theory and charge transfer through molecular coordination, 2,3,7,8-TCDD and other isomers contained in the solvents of transformers can be considered as molecular coordinate compounds. It was found and confirmed that at least a couple of chlorine ions attached to 2,3,7,8-TCDD are apparently monovalent chlorine ion when conducting experiments. (This is re-confirmed by the calculation of electron density distribution.)

(B) It is anticipated that as to the chlorine ion produced as set forth in (A), hypochloric acid (ClO) is formed during the isolation process. (Formula 7).

(C) Alternately, the dioxan group compound with 2,3,7,8-TCDD through N1 bonding opens the ring as diene as a result of the formation of hypochloric acid and sulfonate ($-SO_3$), and polymerization that forms dienophile from azo group ($-N_2$) is promoted. This phenomenon of crystallization is confirmed in the solvent as stored in a refrigerator at 7–8° C. upon stirring. (Formulas 8 and 9).

(D) Based on the above, the reaction formula for 2,3,7,8-TCDD and its isomers upon mixing Solution 1 and Solution 2 with the solvents in the transformer is described by Formula 7.

(E) The Solution 2 put in from the processing bath 26 to the reaction bath 16 during the stirring process at the second step implies the formation of an azo compound that promotes the absorption of methyl group ($CH_3$). (Formula 6)

3. Third Step of Process

The reagent to be used is 1-naphthol-4-sulfonic acid (Solution 3 or Solvent 3). Next to the second step, (Solution 3) in the processing chamber 12 is added to the mixture in the tank 16, followed by stirring. Including reaction time, stirring time required is approximately 15 minutes. The amount of Solution 3 to be added to the mixture is 10% volume. The purpose of using solution 3 is as follows:

In the decomposition process of dioxin (2,3,7,8-TDCC), the path of chlorine ion generated in the solution can be bifurcated, one is chlorine ion to bind with sodium and hydrogen ions ($H^+$) existing in the solution and another is that to form hypochloric acid.

The transition of hypochloric acid to chloric acid is the rate-determining step as well as secondary reaction. This can be expressed with Formula 10, (I) and (II). (The phenomenon of decomposition when the compound has a 3D structure.)

It functions as a catalyst to promote the reaction.

Carbonation of acetone ($CH_3COCH_3$) (Formula 7).

If the solution of 1-naphthol-4-sulfonic acid is employed, azo compound can be formed even with diazonium salt to make methyl group as an absorbent.

4. Fourth Step in Process

The reagent to be used is terpene as an unsaturated hydrocarbon. (Solution 7) (The concentration of terpene, is 0.001% to the original volume of organic solvent in the transformer to be treated).

It is the substance to suppress emission of methyl gas into the atmosphere and reserved in the reagent (solvent) tank 26. At this step, the property of solvent 7. (susceptibility to oxidation or easily oxidized) is utilized. In other words, terpineol is used for releasing OH and thereby the methyl group will become methane ($CH_4$) and alcohol. (Formulas 11 and 12).

5. Fifth Step in Process

The reagents to be used is graphite (Adsorbent 5), calcium oxide or calcium hydroxide (Adsorbent 6) and are reserved in the reagent (adsorbent) tank 28. After the completion of the fourth step (after 30–40 minutes of stirring process), after stirring the organic solvents in the transformer (original body) with Solution 1, Solution 2, Solution 3, and Solution 4 appears as a clear separation at each interface. Clear separation into two phases, top and bottom layers appears in the reaction bath.

The top layer is observed as a pale purple brown phase containing diazonium salt solution and other various compounds such as sodium chloride, dimethyl sulfone, sodium bisulfite, chloric acid, etc. The bottom layer is basically transparent transformer solvent phase with large and small plate crystals floating and metal oxide (copper, lead and other metals) precipitated. The clarity of the solvent layer is to be noted, since it was dark yellow colored solvent as removed from the used transformer before the treatment. Moreover, at the interface between top and bottom layers, chloric acid salt ($HClO_3$) is generated in the form of white, fine powder.

Transparent solvent, crystals, and metal oxide in the bottom layer are then removed from the outlet 44 as in a separated state, and graphite or powdered calcium oxide, etc. is added to the remaining top layer and gradually and quietly stirred. It is the major purpose to adsorb positive and: negative electrons to the interface of a layered compound like graphite and to fix them in a stable manner. (It is possible to add powdered calcium hydroxide. The decision, what to be added, should be made based on the state of the residual chlorine group).

The reason why the absorption process by a layered substance like graphite is essential and an important feature of the present invention is without having this process it is impossible to fix and detoxify the chlorine group, the source of pollution, in a stable manner.

In other words, the major purpose of the invention can be interpreted as the prevention of secondary environmental pollution, that may possibly be caused by eluted chlorine group through the irradiation of ultraviolet ray and visible light over the isolated and fixed (crystallized) chlorine group. However, when the adsorbent 5 and 6 in the invention is used, such elution is essentially prevented and stable fixation of chlorine group can be done completely.

(It should be noted that the stirring process from the first to fifth steps has been carried out at 17° C. as a working temperature.)

6. Sixth Step of Process (Treatment of Exhaust Gas)

In the reaction bath located at the second floor, Solution 3 is prepared. The solution tank 30 is employed (only with Solution 3). Using device 31, the exhaust gas output up to the bath of the fourth step is forced to blow into the solution bath 34.

The reasons why the solution 3 is selected and employed for the treatment with solvent solution at the second floor is as follows:

1) It is weaker in toxicity than 1-naphthol-4-sulfonic acid.
2) Temperature control is easier than diazo salt solution.

In addition, the resolution against dioxin was indicated less than 1% in the experiment using only the solution 3. The solution 3 is more effective to chlorine ion (Cl—) and methyl group (methyl gas) than diazonium salt solution in adsorption and detoxification (converting into methane). Moreover, the azo compound that resulted from the reaction of aromatic-diazonium salt with aromatic amine and phenol compounds (1-naphtol-4-sulfonic acid) has a stronger adsorption effect on methyl group ($CH_3$—) than that of solution 3. The use of this solution is best when the methyl group ($CH_3$—) and chlorine group (Cl—) are dominant.

White fine powder is formed at the interface between top and bottom layers, which is chloric acid, salt. Then, starting from the state as separated top and bottom layers, transparent solvent, crystals, and metal oxide are removed from the outlet 44 and graphite is added and stirred together. The main purpose of the invention is stable fixation of positive and negative electrons through adsorption at the interface of the layered substance like graphite. In addition, it is possible to add powdered calcium hydroxide ($Ca(OH)_2$), that can be determined by the degree of residual chlorine group. As set forth above, stirring from the first to fifth step has been carried out at 17° C. working temperature.

The present invention removes, neutralizes and detoxifies the materials described below:

(1) Organic toxic substances intrinsically existing in products; (2) toxic substances in the emission (exhaust gas) during incineration at a high temperature; (3) hazardous substances formed in the manufacturing process of products; and (4) organic hazardous substances polluting soil and sewage sludge. Therefore, the present invention can be utilized to eliminate various kinds of hazardous pollution including soil pollution, water pollution, and air pollution by removing, neutralizing, and detoxifying organic hazardous substances, maintaining a healthful environment.

The sole FIGURE shows airtight processing chamber 10 (equipped with air conditioning), gas processing chamber 12, the tank or large processing chamber, 16 to treat hazardous samples, exhaust valve 18, treated gas outlet 19, solution tanks 20, 22, 24, 26 (for solutions 1, 2, 3 and 4, respectively) adsorbent tank 28 (adsorbent 5); tank 30 (solution 3), forced exhaust gas air fan 31, auxiliary solution tank 32, primary introductory processing, or evaporation, tank 34, for the exhaust gas, secondary introductory evaporation, or processing bath, tank 36 for the exhaust gas, material, or transformer solvent, inlet pipe 38, stirrer 40, temperature controller, or air-conditioner 42 (for maintaining temperature at 30° C. or below), and outlet 44 for the treated materials. Sodium nitride solution is contained in tank 20, diazonium salt solution is contained in the tank 22, and 1-naphthylamine-4-sulfonic acid salt solution is prepared in the tank 24. Solution 3 is contained in tank 26, and graphite or calcium oxide is contained in tank 28. An output valve 18 for controlling the output is associated with container 16.

In the processing chamber at the second floor (level), the Ad reagent for the gas phase treatment is prepared. Such a reagent is distributed from the tank 30 to the processing bath 34. This bath is an auxiliary one and the use of the bath may depend on the volume of exhaust gas and the substances treated, and if it appears not necessary to use, it can be left unused and empty. Transformer solvent is introduced into the processing system through the inlet pipe 38 and released through the outlet 44 by opening the valve 18 after treatment.

Solvents tetrachloroethylene, Trichloroethylene, 2,4,6-trichlorophenol and chlorodibenzodioxene are magnetized solutions and comprise substances that are solute that change form from a permanent dipole molecule to a polar solute having a dipole momentum as it is dissolved in a medium. Moreover, amines are the substances that become a polar substance having donor and acceptor groups at the 1- and 4-position of the benzene ring (aromatic amines have substitute groups on these positions). Solvents chlorophenol and 1-chloro-2-propanol ($CH_2ClCH(OH)CH_3$) are used as the material to adsorb other substances or an adsorbent, and they have a layered structure or layered (stratified) compounds. Alkyl halide (($C_nH_2n+3$)X, where Xua halogen) is a liquid solvent substance having magnetic properties.

While the invention has been described with reference to its preferred embodiments, it will be understood by those skilled in the art that various changes may be made and equivalents may be substituted for elements thereof without departing from the true spirit and scope of the invention. In addition, many modifications may be made to adapt a particular situation or material to the teaching of the invention without departing from its essential teachings.

What is claimed is:

1. A method for neutralizing and detoxifying organic hazardous substances comprising treating said organic hazardous substances with a solvent, a first adsorbent, a second adsorbent and solutions, said solutions being sodium nitrite, sodium 1-naphthylamine-4-sulfonate, 2-naphthol-4-sulfonic acid and the isomer of 2-naphthol-4-sulfonic acid.

2. The method of claim 1 wherein said first adsorbent is selected from the group consisting of calcium oxide and calcium hydroxide.

3. The method of claim 2 wherein said solvents is selected from the group consisting of terpene terpineol.

4. The method of claim 3 wherein said second adsorbent is graphite.

5. A method of neutralizing and detoxifying organic hazardous substances comprising the steps of:
   a mixing said organic hazardous substances with sodium nitrite;
   b stirring in sodium 1-naphthylamine-4-sulfonate;
   c stirring in 2-naphtol-4-sulfonic acid and its isomer;
   d stirring in a solvent selected from the group consisting of terpene and terpineol;
   e adding an adsorbent selected from the group consisting of calcium oxide and calcium hydroxide; and
   f adding graphite.

* * * * *